(12) United States Patent
Wagner et al.

(10) Patent No.: US 8,086,658 B2
(45) Date of Patent: Dec. 27, 2011

(54) PERSONALIZED DISCOVERY OF SERVICES

(75) Inventors: Matthias Wagner, Munich (DE);
Wolf-Tilo Balke, Hannover (DE)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/557,270

(22) PCT Filed: Jun. 20, 2003

(86) PCT No.: PCT/EP03/06537
§ 371 (c)(1),
(2), (4) Date: Nov. 16, 2005

(87) PCT Pub. No.: WO2004/102925
PCT Pub. Date: Nov. 25, 2004

(65) Prior Publication Data
US 2007/0033261 A1    Feb. 8, 2007

(30) Foreign Application Priority Data
May 6, 2003    (WO) ........................ PCT/EP03/05201

(51) Int. Cl.
*G06F 15/16* (2006.01)
(52) U.S. Cl. ........................................... 709/201
(58) Field of Classification Search ............ 707/E17; 709/201, 231
See application file for complete search history.

(56) References Cited

U.S. PATENT DOCUMENTS

| | | | |
|---|---|---|---|
| 6,411,950 B1 * | 6/2002 | Moricz et al. ................. | 1/1 |
| 7,089,216 B2 * | 8/2006 | Van Overveld ................ | 706/12 |
| 7,249,100 B2 * | 7/2007 | Murto et al. .................. | 705/50 |
| 7,756,772 B1 * | 7/2010 | Konopnicki et al. .......... | 705/37 |
| 7,761,885 B2 * | 7/2010 | Labrou et al. ................. | 719/330 |
| 2002/0002899 A1 * | 1/2002 | Gjerdingen et al. ........... | 84/667 |
| 2002/0059161 A1 | 5/2002 | Li | |
| 2003/0005412 A1 * | 1/2003 | Eanes ........................... | 717/120 |
| 2003/0036917 A1 * | 2/2003 | Hite et al. ..................... | 705/1 |
| 2003/0135582 A1 * | 7/2003 | Allen et al. ................... | 709/217 |
| 2003/0163450 A1 * | 8/2003 | Borenstein et al. ........... | 707/1 |
| 2003/0163597 A1 * | 8/2003 | Hellman et al. .............. | 709/316 |
| 2003/0179228 A1 * | 9/2003 | Schreiber et al. ............ | 345/738 |
| 2004/0030531 A1 * | 2/2004 | Miller et al. .................. | 702/182 |
| 2004/0030627 A1 * | 2/2004 | Sedukhin ...................... | 705/36 |
| 2004/0054690 A1 * | 3/2004 | Hillerbrand et al. .......... | 707/104.1 |

(Continued)

FOREIGN PATENT DOCUMENTS

EP    0 845 748 A    6/1998

(Continued)

OTHER PUBLICATIONS uddi.org. UDDI Technical White Paper. Sep. 6, 2000. pp. 1-13.*

(Continued)

*Primary Examiner* — John Follansbee
*Assistant Examiner* — Imad Hussain
(74) *Attorney, Agent, or Firm* — Nutter McClennen & Fish LLP; John J. Penny, Jr.; Christina M. Sperry

(57) ABSTRACT

A method of discovering at least one service being advertised in a communication system using at least one service ontology describing service characteristics with service attributes supports user-centered and personalized discovery of services. A discovery statement is formulated as a function of the query term and services with service attributes matching the discovery statement are discovered using the structure implied by the service ontology.

13 Claims, 12 Drawing Sheets

U.S. PATENT DOCUMENTS

| | | | |
|---|---|---|---|
| 2004/0093559 A1* | 5/2004 | Amaru et al. | 715/502 |
| 2004/0107155 A1* | 6/2004 | Yanosy | 705/37 |
| 2004/0111525 A1* | 6/2004 | Berkland et al. | 709/231 |
| 2004/0148334 A1* | 7/2004 | Arellano et al. | 709/201 |
| 2004/0162741 A1* | 8/2004 | Flaxer et al. | 705/7 |
| 2004/0186705 A1* | 9/2004 | Morgan et al. | 704/9 |
| 2005/0138173 A1* | 6/2005 | Ha et al. | 709/225 |
| 2005/0246726 A1* | 11/2005 | Labrou et al. | 719/328 |
| 2007/0033261 A1* | 2/2007 | Wagner et al. | 709/217 |
| 2007/0094256 A1* | 4/2007 | Hite et al. | 707/6 |
| 2007/0174270 A1* | 7/2007 | Goodwin et al. | 707/5 |
| 2010/0153426 A1* | 6/2010 | Kim et al. | 707/765 |

FOREIGN PATENT DOCUMENTS

| | | |
|---|---|---|
| EP | 1 050 830 A | 11/2000 |
| EP | 1050830 | 11/2000 |
| EP | 1217542 A1 * | 6/2002 |
| JP | 08-077182 | 3/1996 |
| JP | 09-062702 | 3/1997 |
| JP | 11-296533 A | 10/1999 |
| JP | 11-296537 A | 10/1999 |
| JP | 2000082067 A | 3/2000 |
| JP | 2002-258874 A | 9/2002 |
| JP | 2002251411 A | 9/2002 |
| JP | 2002258874 A | 9/2002 |
| WO | WO-02 13064 A | 2/2002 |
| WO | WO-0213064 | 2/2002 |
| WO | WO0250707 A1 * | 6/2002 |
| WO | WO-02 095624 A | 11/2002 |
| WO | WO-02095624 | 11/2002 |

OTHER PUBLICATIONS

Doan, J. Madhavan, P. Domingos, and A. Halevy. Learning to map between ontologies on the semantic web. In the Eleventh International WWW Conference, Hawaii, US, 2002, pp. 1-12.*

Fensel, D. and C. Bussler. The web service modeling framework (WSMF). Electronic Commerce Research and Applications 1, 2 (2002), pp. 1-33.*

Lemahieu, Wilfried. Web service description, advertising, and discovery: WSDL and beyond. 2001. pp. 1-21.*

Lander, Susan E. Sharing Metainformation to Guide Cooperative Search Among Heterogeneous Reusable Agents, IEEE Transactions on Knowledge and Data Engineering, Mar.-Apr. 1997. pp. 193-208 (1-16).*

Amann et al. Integrating ontologies and thesauri for RDF schema creation and metadata querying. Sep. 2000. Springer-Verlag. Int J Digit Libr (2000) 3: 221-236. pp. 1-16.*

Horrocks, Ian. DAML+OIL: a Description Logic for the Semantic Web. Jun. 2002. IEEE. pp. 1-7.*

Ankolekar et al. DAML-S: Web Service Description for the Semantic Web. Jun. 2002. ISWC. pp. 1-15.*

McIlraith, Sheila A. et al. Semantic Web Services. Mar./Apr. 2001. IEEE Intelligent Systems. pp. 1-8 (46-53).*

Wagner, Matthias et al. A Roadmap to Advanced Personalization of Mobile Services. 2002. pp. 1-5.*

"Unraveling the Web Service Web: an introduction to SOAP, WSDL, and UDDI", Piscataway, NJ, p. 86-93, Mar./Apr. 2002.

International Preliminary Examination Report (dated Apr. 28, 2005).

International Search Report (dated Nov. 26, 2003).

"UDDI Technical White Paper", XP002230398 Retrieved from the Internet: URL:http://www.uddi.org/pubs/lru_IDDO_Tecj moca;_White_Paper.pdf>[retrieved on Feb. 7, 2003].

Japanese Office Action, Japanese Patent Application No. 2004-571780, Mailed Sep. 1, 2009.

Japanese Office Action, JP Application No. 2004-571777, mailing date Sep. 1, 2009.

Notice of Reasons for Refusal issued Mar. 23, 2010 for Japanese Application No. 2004-571777.

Takahiro Kawamura, XML Web Services, dynamically linking services on the Internet, Toshiba Review, Japan, Toshiba Corporation, Feb. 1, 2003, vol. 58, No. 2, pp. 23-26.

* cited by examiner

FIG.12
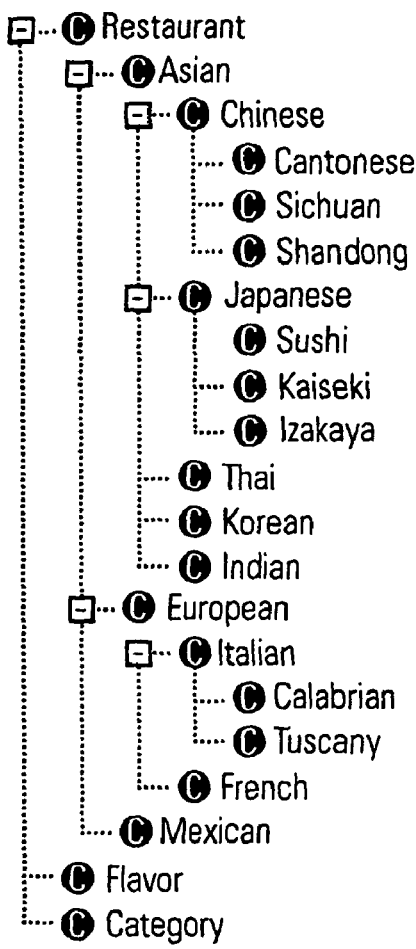
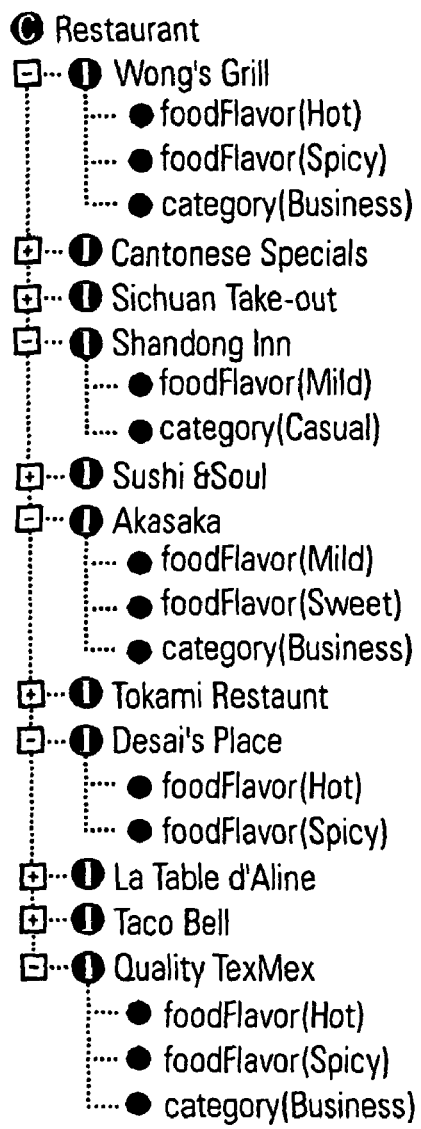

PERSONALIZED DISCOVERY OF SERVICES

FIELD OF INVENTION

The present invention relates to a method and apparatus for service discovery, and in particular to a method and apparatus for cooperative service discovery on the basis of service ontologies describing service characteristics with service attributes.

TECHNOLOGICAL BACKGROUND

In WO 02/095624 A2 there is described a computerized search method for categorization of Internet sides according to the intended activity of the user. In more detail, there is provided an Internet search method based on directory selections of purpose for activities intended by system users. The Internet search method relates to organization of a list of web sides offering online access on an electric network, wherein the list includes categories of purposeful activities for searches by users.

In US-A1-2002/059161 there is described an approach for supporting a web query expansion using multi-granularity indexing and query processing. Queries are expanded conceptionally, using semantically similar and syntactically related words to those specified by the user in the query to reduce the chances of missing relevant documents.

Further, in JP-A-2000082067 there is described a document retrieval device and method wherein a query suitable to a data base retrieval is set based on a primary query that is imported in the conception of a user and the information is retrieved based on the query. A database indexes and holds documents groups which are previously collected via a keyword/relative expression extractions part.

Generally, services as to be understood within the present specification relate to services provided through any generic service platform supporting service discovery and service interaction, e.g., Web service platforms, further service provision platforms beyond the third generation of mobile communication environments.

In view of increased variety of services, it is essential that users are supported in the discovery and selection of appropriate services that fulfill their individual tasks and needs. When trying to discover a service providing appropriate capability a user usually will have certain preferences towards the utility in view of different objects or information each service may provide.

Currently known approaches to achieve this rely, e.g., on the so-called Web Service Paradigm, W3C, Web Services Activity (Architecture Domain), http://www.w3.org/2002/ws, 2002.

A first approach to service discovery relies on Universal Description and Discovery UDDI (The UDDI Technical White Paper, http://www.uddi.org/). For discovery purposes Universal Description and Discovery UDDI provides an Internet-wide network of registries and features information about providers of a service and invocation details in the style of yellow pages. Though Universal Description and Discovery UDDI is now widely used it suffers from severe shortcomings. Universal Description and Discovery UDDI is limited to keyword matching and does not support any kind of flexibility in service discovery.

Further approaches to service discovery rely on WSDL (E. Christensen, F. Curbera, G. Meredith, and S. Weerawarana, Web Services Description Language (WSDL) 1.1. http://www.w3.org/TR/2001/NOTE-wsdl-20010315, 2001) or ebXML (ebXML.ebXML Web Site. http://www.ebXML.org/). While WSDL or ebXML are promoted today to implement service catalogs in business-to-business service provision environment, they still lack efficient concepts for service personalization.

In conclusion, currently only limited support is provided for a user-centered and personalized discovery of services. Nevertheless, with increasing number of services to be seen in the future, it is crucial that such support is given to service users to enable a subsequent selection of appropriate services fulfilling individual needs and expectations of service users.

SUMMARY OF INVENTION

In view of the above, the object of the present invention is to support user-centered and personalized discovery of services.

According to the present invention, this object is achieved through a method of discovering at least one service being advertised in a communication system. Here, according to the present invention, it is assumed that advertisement is achieved using a so-called service ontology describing service characteristics. After receipt of a query term for service discovery, a discovery statement is formulated as a function of the query term. Then, a discovery of services is achieved by looking for the best match of service attributes represented through the service ontology and the formulated discovery statement using the structure implied by the service ontology.

An important advantage of the present invention is the application of information available in the service ontology describing service characteristics with service attributes for service discovery, or in other words a cooperative approach to service discovery. Services are discovered not only through a one-to-one comparison of query term parameters with service parameters promoted for service advertisement, but discovery relies on finding a match between service attributes and discovery statement using the structure implied by the service ontology.

In particular, the use of a structure implied by the service ontology improves interaction with aggregated service catalogues during service discovery, as in view of a formulated discovery statement, a sub-set of services with service attributes matching or closely matching the discovery statement may be found more efficiently in the overall group of services advertised for service discovery.

The reason for this is that services having related service attributes are arranged in close proximity in the service ontology according to the related structure, so that discovery of services is achieved in a user objective driven way and not randomly. This also allows to significantly reduce the number of discovered services and the burden imposed on the user during service selection.

Another important advantage of the present invention is that efficient discovery of services forms the prerequisite for subsequent selection of services according to service offers and also for subsequent service execution. In other words, efficient and effective service discovery paves the way for personalized selection and execution of services.

Another to a preferred embodiment of the present invention it is proposed to enrich the initially submitted query term through information reflecting a usage pattern.

Here usage patterns reflect service contexts and typical usages for user groups. Considering typical usage patterns allows to enrich the query term for improvement of the degree of personalization during service discovery.

This is particularly true when members of certain user groups tend to submit only the minimum amount of information with the query term which they consider imperative for service discovery to reduce the burden on their side. Using usage patterns available for typical service application scenarios that may be procured, e.g., over time or from further service users in the same user group improves the degree of personalization during service discovery.

According to another preferred embodiment of the present invention, availability of a usage patterns is evaluated after submission of a query term. Preferably, when such a usage pattern is not available a default standard usage pattern will be retrieved, while otherwise existing usage patterns are retrieved.

This preferred embodiment of the present invention increases quality of personalization as fallback to default usage patterns is supported.

According to another preferred embodiment of the present invention usage pattern is determined with respect to a submitted query term. Preferably, the type and values of query parameters are compared with the type and values of parameters defined for usage pattern. Then, a best match in view of the comparison result allows for selection of an appropriate usage pattern with respect to a received query term.

An important advantage of this preferred embodiment is the support of the service user through automatized selection of usage patterns for subsequent personalized discovery. In other words, the present invention does not only support the improvement of quality of service discovery, but also the ease of initiation of such a service discovery for the service user.

According to another preferred embodiment of the present invention, it is proposed to formulate the discovery statement through expansion of the query term with parameters expressing user preferences.

Further to the application of usage patterns outlined above, this preferred embodiment of the invention has the advantage of personalization with respect to a dedicated service user.

In other words, the service user has the option to tune the discovery process according to his personal needs and preferences. Applying user preferences and user profiles for enrichment of a query term when formulating a discovery statement therefore allows to optimize the degree of personalization during service discovery.

According to another preferred embodiment of the present invention, the step of formulating a discovery statement comprises the step of expanding the query term by a service user conception of a service.

An important advantage of this preferred embodiment of the present invention is that even when a service ontology represents a specific service conception not in compliance with the service conception of the service user, nevertheless the service conception of the service user may be integrated into the discovery process through appropriate expansion of the query term.

E.g., while a service ontology may promote the advertisement of restaurant service along regional service conceptions, a service user may have a view on restaurant services according to flavor. Here, the expansion of the query term according to a service user conception renders the service discovery process independent of the set-up of the service ontology.

According to another preferred embodiment of the present invention, service discovery relies on a plurality of service ontologies for discovery and an appropriate service ontology is selected prior to service discovery. Preferably, the selection of service ontology is achieved according to information received with the query term and/or according to user profile data.

An important advantage of this preferred embodiment is that service discovery according to the present invention is not restricted to a static, single one service ontology but is also supported in view of a plurality of service ontologies that may be operated in a service catalogue. Here, personalization and customization is particularly supported through evaluation of information given in the query term.

Yet another important advantage is that the selection of the service ontology may be driven by user profile data which allows for selection of an appropriate service ontology for service discovery even if a service user does not submit information with the query term that reflects his preferences or long-term service application habitudes.

A further preferred embodiment of the present invention relates to the identification of a starting position in the service ontology. Here, it is proposed that the query term and the related structure of service attributes is subsumed or integrated into the service ontology, e.g., through modification of the service ontology so as to represent service characteristics in compliance with the structure of the query term. One may then use the elements in the service ontology following the subsumed query term as starting position for service discovery.

An important advantage of this preferred embodiment of the present invention is that through appropriate modification of the service ontology before service discovery, efficiency of the overall discovery process may be increased significantly. Also, the modification of the service ontology allows exploitation of existing mechanisms and algorithms for service ontology management in support of service discovery.

According to another preferred embodiment of the present invention it is proposed to traverse the service ontology according to the formulated discovery statement. Preferably, the traversal of the service ontology may be iterated for improvement of service discovery results.

An important advantage of this preferred embodiment of the present invention is the impact of the discovery statement carrying personalization information in combination with the structure implied by the service ontology during traversal of the service ontology.

This increases efficiency in finding a match between a formulated discovery statement and service attributes of services modeled through the service ontology. The reason for this is that the exploitation of the structure implied by the service ontology, e.g., through climbing-up or going-down in an ordered hierarchy of the service ontology, allows to avoid a time-consuming scan of all services advertised. To the contrary, the available solution space for service discovery is scanned efficiently pruning those service offers that per se are inadequate candidates for service discovery in view of personalization constraints.

At the same time the number of services retrieved is reduced significantly, as again personalization allows for pruning of services not reflecting user preferences expressed in the discovery statement.

According to another preferred embodiment of the present invention, it is proposed to relax a discovery statement between iteration of service ontology traversals.

An important advantage of this preferred embodiment of the present invention is that the discovery statement may be successively tuned for personalization, e.g., by relaxing user preferences or usage pattern parameters, by changing service conception, or by using a different service ontology, until results of service discovery are generated.

It should be noted that relaxing in the most general sense according to the present invention also implies adding constraints and/or further restriction of constraints already added to a discovery statement for achievement of a higher degree of personalization. This is particularly suitable for a discovery scenario where a traversal of a service ontology leads to a high number of discovered services. In this situation there is room for further specification of user preferences and therefore for further optimization of service discovery quality.

In view of the above, according to the present invention usage patterns, user preferences, and/or user-specific service conceptions may also be used for enrichment of query terms when re-formulating a discovery statement. In other words, user personalization specific information will be applied twofold, i.e. for initial formulation of a discovery statement and during relaxation of such a discovery statement between iterations of traversal of service ontologies.

An important advantage of this approach is that it avoids ambiguities in taking a decision how to further proceed with service discovery when a desired degree of match from a discovery statement to service attributes promoted through the service ontology may not be identified from the very beginning. Again, the incorporation of data reflecting user preferences for determination of a relaxation order guides service discovery into a direction in compliance with the user preferences and therefore improves efficiency and service discovery quality.

Further, the relaxation along the service user conceptions allows to over-write the structure implied through the service ontologies. In other words, assuming again that a desired degree of match for a discovery statement is not available from the very beginning, it is then possible to change the strategy for service discovery through incorporation of a view of the service user on available services differing from the way service offers are structured in the service ontology.

According to another preferred embodiment of the present invention there is provided a computer program product directly loadable into the internal memory of an apparatus for discovering at least one service being advertised using at least one service ontology comprising software code portions for performing the inventive discovery process when the product is run on a processor of the apparatus.

Therefore, the present invention is also provided to achieve an implementation of the inventive method steps on computer or processor systems. In conclusion, such implementation leads to the provision of computer program products for use with a computer system or more specifically a processor comprised in, e.g., an apparatus for discovering at least one service being advertised using at least one service ontology.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or telephone networks via modems or other interface devices. It should be understood that such media, when carrying processor readable instructions implementing the inventive concept represent alternate embodiments of the present invention.

Overall, the present invention supports personalization during service discovery, which will play a key role in the discovery, selection, and composition of services as already today service variety offers users to choose between different competing services to perform their specific tasks.

This holds particularly true with seamless integration of networks as here the variety may be expected to grow by orders of magnitude. In particular, service discovery in the sense of the present invention paves the way to adequate personalization of subsequent service selection, as only an appropriate service discovery reveals a choice of adequate and available services.

Further, personalized and automated service discovery avoids tedious manual access of an unstructured set of services to evaluate the suitability in view of a service task. Using a service user's notion of relevance as it is expressed in a suitable service ontology, usage patterns, and/or user preferences, both for enrichment of the query term and/or relaxation of requirements formulated for service discovery thus improves service provisioning and fosters usability of discovered services.

Further, service discovery according to the present invention is suitable for any type of service platform, e.g., semantic Web Services, proactive services, intelligent agents, etc., and takes benefit from database system technology, knowledge engineering, and schemes known from artificial intelligence.

Further, personalization of service discovery allows for adaptation to a plethora of devices for service delivery, e.g., wired phone, wireless phone, wireless hand-held, internet connected desktop, laptop/WLAN, pager, etc., further to adapt to different roles of service users, e.g., employees looking for approvals, being members of project teams, traveling for business, of private service users, and also to adapt to a changing service delivery context on the go, e.g., office environment, airplane, etc. Under any such consideration what is achieved is avoidance of information overload and ease of service delivery.

BRIEF DESCRIPTION OF DRAWING

In the following preferred embodiments of the present invention will be explained with reference to the drawing in which:

FIG. 12 shows a restaurant service ontology as example for the application of the discovery mechanisms according to the present invention;

DESCRIPTION OF PREFERRED EMBODIMENTS

Figure 1:
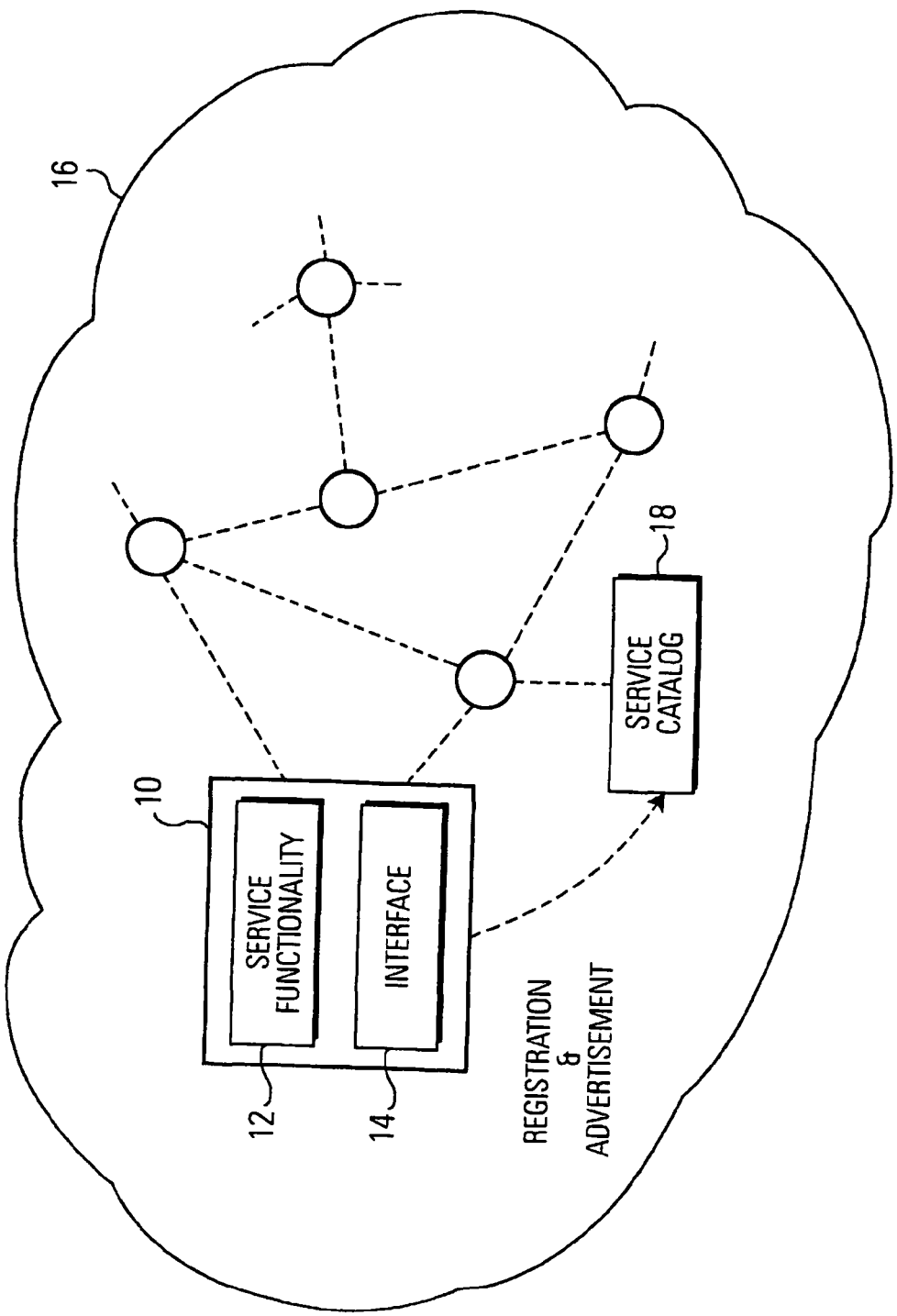
FIG. 1 shows a schematic diagram illustrating the provision of services in the sense of the present invention.

Throughout the description of the best mode and preferred embodiments of the present invention the terminology used in the following should be understood as follows:

Constraints:=Set of query parameters or attributes to be fulfilled during service discovery. Constraints are either imposed on a service interface or on a service output.

Service:=A service is a software object or a network entity, meant to interact with other services or an end user, encapsulating certain functionality or a set of functionalities. A service has a defined interface.

Hard Constraints:=Constraints that have to be fulfilled strictly.

Query Term:=Phrase used to communicate with a service catalog or the service itself. A query term expresses user needs in terms of hard/soft constraints. A query language is defined and used to express query terms, e.g., the Structured Query Language SQL for catalogs/services implemented through standard database systems. A query term may also contain semantic descriptions.

Query Relaxation/Expansion:=Re-formulation of a given query term either through adding new constraints, typically soft constraints, or the explicit relaxation of soft/hard constraints with respect to a given or associated user preference.

Service Catalog:=Services are registered and advertised with specialized network entities/nodes, i.e., service catalogs, for automated advertisement and discovery by clients. Catalogs may also be distributed over a plurality of nodes in a network. For Web Services UDDI repositories are often used as catalogs.

Semantic Service Description:=verbal service characterization for semantic meaningful advertisement of a service, e.g., keywords or an ontology-based description, e.g., DAML-S or Semantic Web.

Service conception:=Reflects a service user view on services advertised through a service ontology, e.g., according to consideration of different service attributes reflecting service user objectives. A service ontology may be set up or re-arranged according to service conceptions underlying different service discovery processes.

Service Ontology:=Partial order on service attributes and/or concepts with respect to a certain service conception, e.g., an order of the 'better-than'-type or of the IS-A type. Typically, a service ontology may impose a hierarchy on service attributes and/or concepts to impose a structure on available services for support of service discovery.

Soft Constraints:=Constraints that should be fulfilled, if possible, e.g., user preferences.

User Preferences:=User preferences are used to express user wishes either through a partial order of relevant terms (I like A better than B, I prefer A over C, etc.) or through reasonable numerical soft constraints (minimize the price of a service, find the nearest service, get the closest flight booking date, etc.) in naturally ordered domain. User preferences may be expressed in semantic form using common techniques from knowledge representation.

Usage Pattern:=Set of soft service constraints and/or hard service constraints reflecting preferences and typical service application conditions for service user groups.

User Profile:=Set of hard and/or soft constraint in association with a service user. A user profile may be maintained anywhere in a communication system, e.g., at the network side in a network node or at the end user side in a terminal, e.g., a mobile terminal.

Web Service:=A Web service is a special service identified by a URI uniform resource identificator, whose interfaces and bindings are defined and described using XML. Its definition can be discovered by other software systems, typically through (centralized) service catalogs. These systems may then interact with the Web service in a manner prescribed by its definition, using XML based messages conveyed by Internet protocols.

FIG. 1 shows a schematic diagram illustrating the provision of services in the sense of the present invention.

As shown in FIG. 1 and outlined above, a service 10 encapsulates at least one functionality 12 which is provided through a defined interface 14 in a network 16. Irrespective whether a service is provided as software object or network entity or a combination thereof, interaction with other services or service end user(s) is achieved via service signature allowing for an exchange of information necessary for service invocation. It should be noted that the present invention is not restricted to a particular type of network, and is applicable, e.g., to mobile communication networks, the Internet, local networks, converged networks, heterogeneous networks, peer-to-peer networks, etc., or any combination thereof.

In other words, after instantiation of service typed parameters or equivalently signature parameters a service may be invoked through a related service request. While the present invention is not to be understood as being restricted to a particular type of service, typical non-binding examples of services are Web services, I-mode services, other distributed service paradigms, e.g., CORBA, JINI, JXTA.

As shown in FIG. 1, a service catalog 18 is provided to register and advertise different services provided in the network 16. A service catalog may be distributed over a plurality of nodes in the network 16. Service catalogs 16 achieve advertisement and promoting of services using service descriptions on an abstracted level, e.g., a semantic service description on the basis of service ontologies as outlined above.

In view of the above, it should be clear that service discovery using an abstract service description on the basis of query terms is a pre-requisite for service selection through a service user.

As will be explained in the following, the present invention significantly improved mechanisms for service discovery. According to the present invention service discovery is not only based on abstract service description, but also on service discovery mechanisms enriched with user preferences for personalized service discovery.

Figure 2:
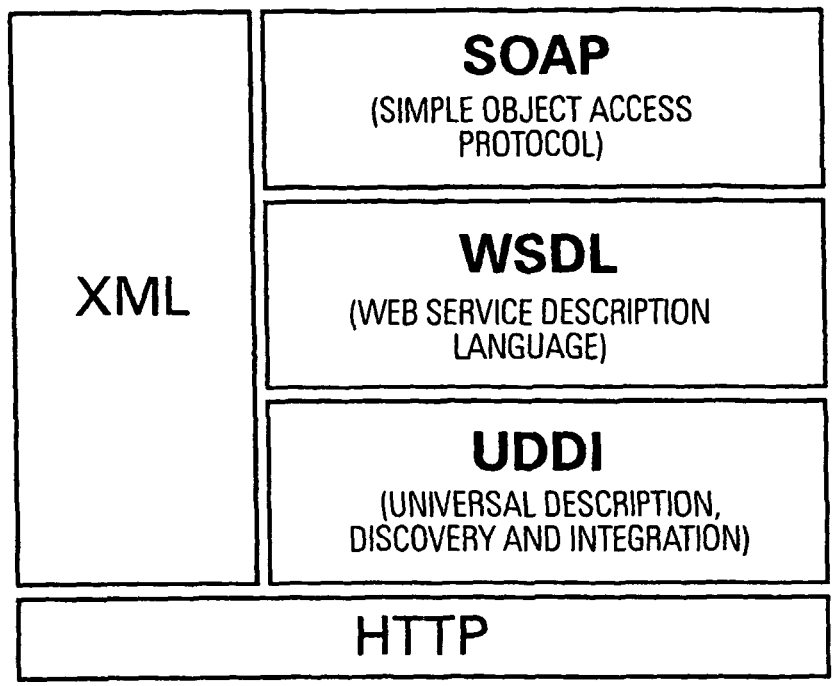
FIG. 2 shows approaches to Web service provision for support of service selection according to present invention.

FIG. 2 shows approaches to Web service provision for support of service discovery according to present invention.

As shown in FIG. 2, the present invention is also applicable in combination with a plurality of existing approaches to enhanced service description and service advertisement.

Service discovery may be achieved through Universal Description Discovery and Integration, UDDI, as approach to online registry of Web services. Further alternatives are Web Service Description Language, WSDL, as XML based vocabulary, and the Simple Object Access Protocol SOAP, E-Speak comparing service requests with service descriptions, and/or ebXML, not shown in FIG. 2, offering service description from a workflow perspective.

Figure 3:
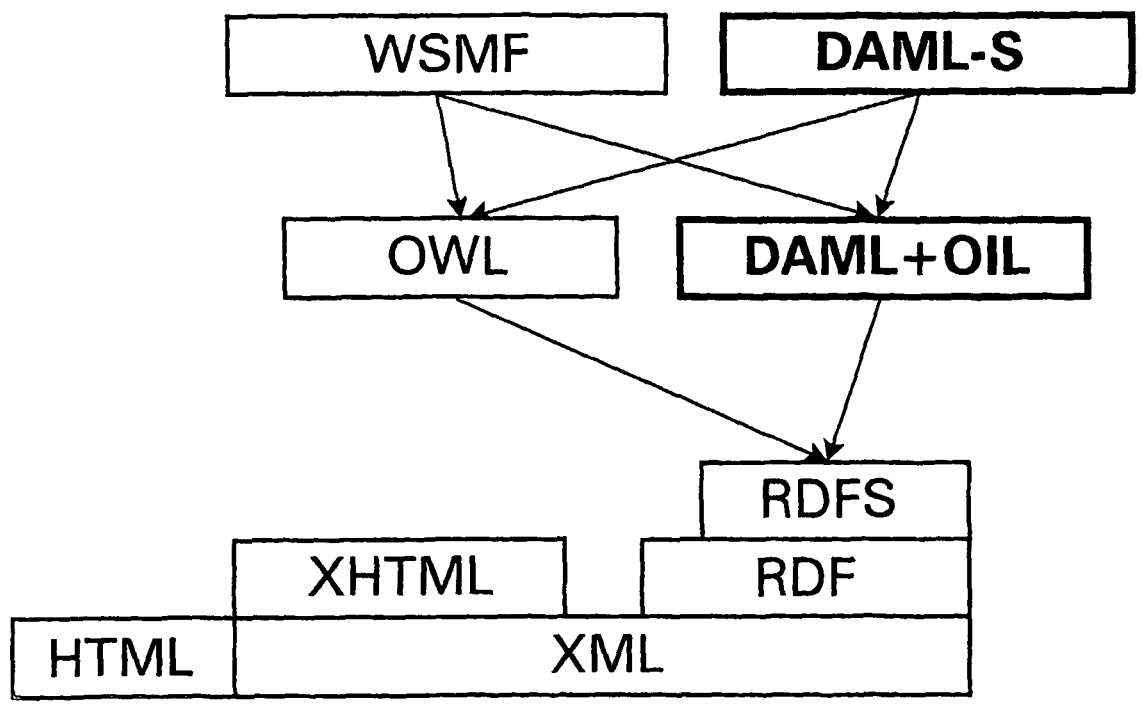
FIG. 3 shows approaches to semantic Web service provision for support of service selection according to the present invention.

FIG. 3 shows approaches to semantic service provision for support of service discovery according to the present invention.

DAML-S is an ontology-based approach to description of Web services and aims at providing a common ontology of services. Build on top of DAML+OIL, D. Connolly et al. DAML+OIL Reference Description, W3C note, December 2001, the design of DAML-S follows the layered approach to semantic web markup languages. DAML-S aims at providing an ontology that allows an agent and users to discover, invoke, and compose Web services. The structure of the DAML-S ontology is threefold and has a service profile for advertising and discovering services, a process model giving detailed descriptions of the service operation, and a service grounding which provides details on how to interoperate with a service via message exchange.

As shown in FIG. 3, another alternative for semantic service discovery is a Web Service Modeling Framework, WSMF, describing the pre-conditioning and post-conditioning of services together with a service model. The Web Service Modeling Framework, WSMF, aims at strongly de-coupling the various components implementing a Web service application while at the same time providing a maximum degree of mediation between the different components. Web Service Modeling Framework, WSMF, builds on comprehensive ontologies such as DAML-S and provides the concepts of service objective repositories and mediators to resolve service request.

While above different standards for service discovery have been discussed with respect to FIG. 2 and FIG. 3, clearly they are considered as non-binding to the scope of the present invention. Further, any of the functionalities to be explained in the following, may be either realized in hardware, software, or a combination thereof.

As outlined above, the present invention relates to the personalization of user-centered service provisioning, where an ontology-based discovery makes use of user preferences, different user service conceptions, and standard usage patterns. Here, service ontology according to the present invention is to be understood as partial order on service attributes with respect to specific service conception. Typically, a service ontology may impose a hierarchy on service attributes to structure available services for support of service discovery.

Figure 4:
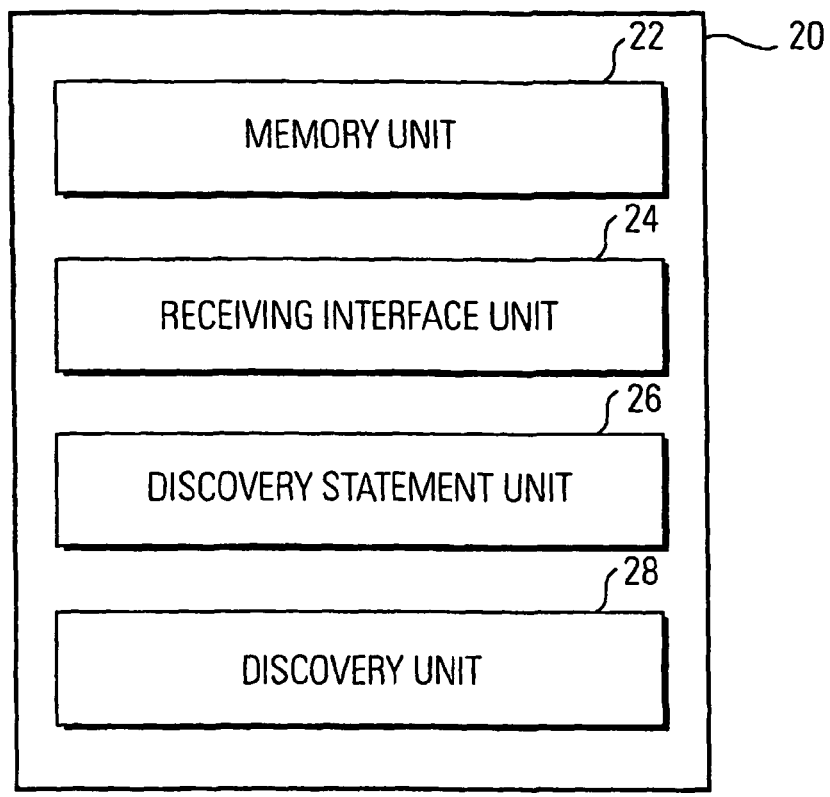
FIG. 4 shows a schematic diagram of an apparatus for discovering services through use of service ontologies according to the present invention.

FIG. 4 shows a schematic diagram of an apparatus for discovering at least one service being advertised, e.g., in a communication system, using at least one service ontology.

As shown in FIG. 4, the discovery apparatus 20 comprises a memory unit 22, a query term receiving unit 24, a discovery statement unit 26, and a discovery unit 28.

Figure 5:
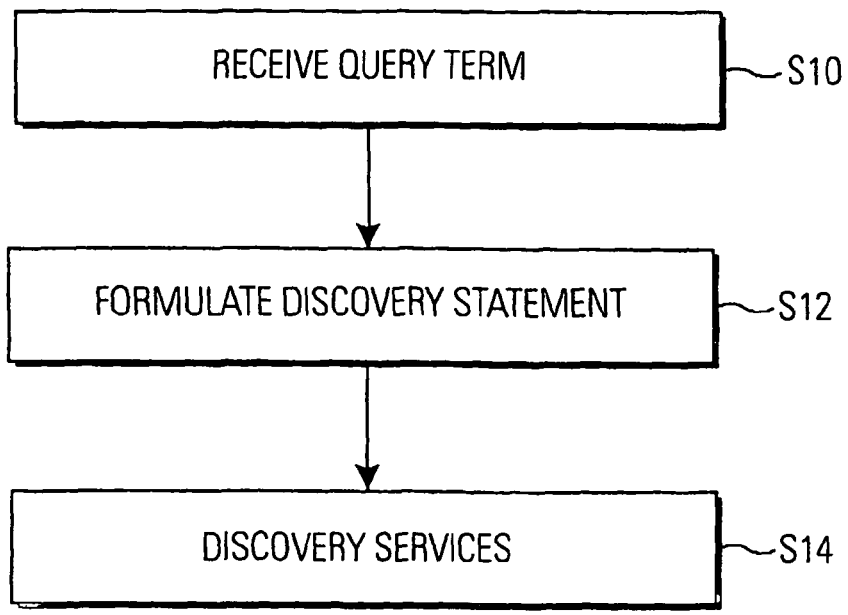
FIG. 5 shows a flowchart of operation for the apparatus shown in FIG. 4.

FIG. 5 shows a flowchart of operation for the discovery apparatus 20 shown in FIG. 4.

As shown in FIG. 5, in a step S10, operatively executed by the receiving unit, a query term is received for service discovery from a service user. Subsequent hereto, in a step S12, operatively executed by the discovery statement unit 26, a discovery statement is formulated as a function of the query term.

Operatively, the discovery statement unit 26 has access to the memory unit 22 for enrichment of the statement function of the query term through use of usage patterns, usage preferences, and/or service conceptions, as will be outlined in more detail in the following.

As shown in FIG. 5, in a step S14, operatively executed by the discovery unit 28, services are discovered by looking for a match of service constraints in the discovery statement and service attributes and related attribute values propagated through the service ontology. Here, operatively the discovery unit 28 has access to the memory unit 22 for use of the service ontology and the related structure implied on service characteristics during service discovery.

Further, operatively the discovery unit 28 may execute service discovery iteratively through re-formulation of the discovery statement until a match between services propagated in the service ontology and a discovery statement is achieved.

Figure 6A:
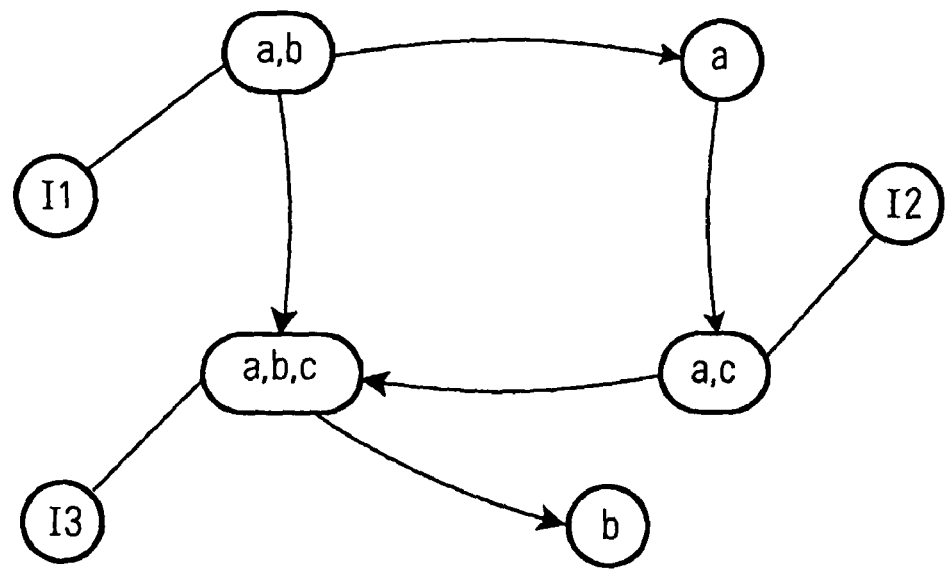
FIG. 6(a) and 6(b) show typical examples of structures induces by service ontologies.
Figure 6B:
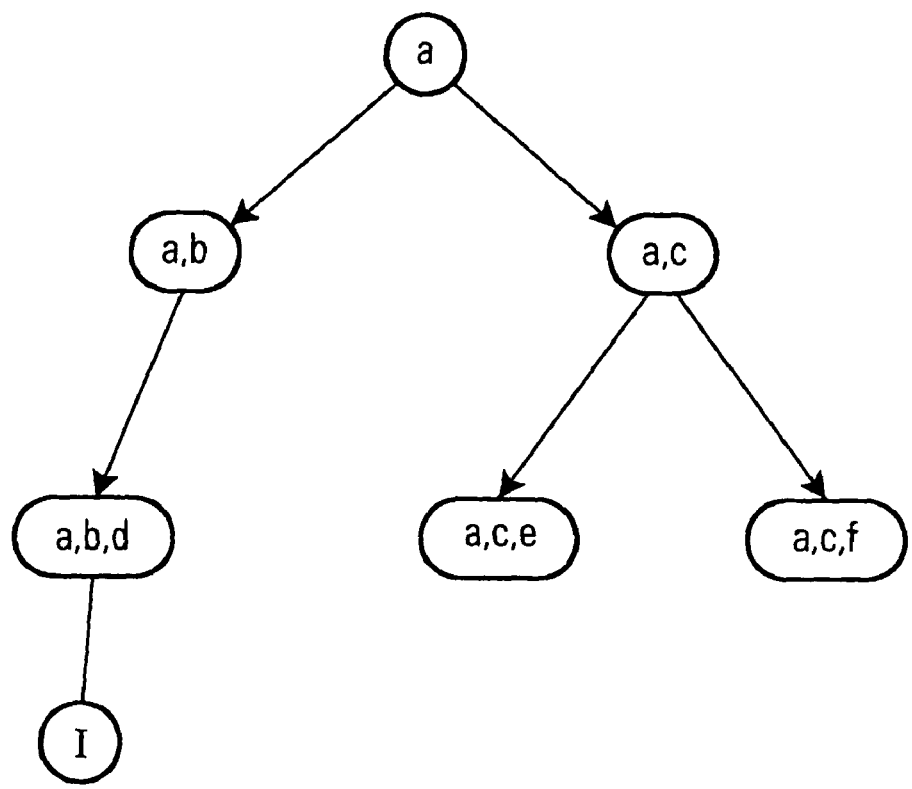

FIGS. 6(a) and 6(b) show typical examples of structures induced by service ontologies according to the present invention.

As shown in FIGS. 6(a) and 6(b), a service ontology may be seen as partial order on service attributes or, in other words, as a acyclic directed graph where nodes represent sets of service attributes, respectively, and directed edges represent a relation between such set of service attributes.

As shown in FIGS. 6(a) and 6(b), instantiations of services may be represented as service nodes being connected to nodes in the service ontology via undirected edges for representation of instantiations of service attributes propagated through the service ontology.

It should be noted that while the service ontology shown in FIG. 6(a) represented a partial order on sub-sets of service characteristics, the service ontology shown in FIG. 6(b) represents a more specific form of a partial order, i.e. a hierarchy on sub-sets of service characteristics and conceptions.

Figure 7:
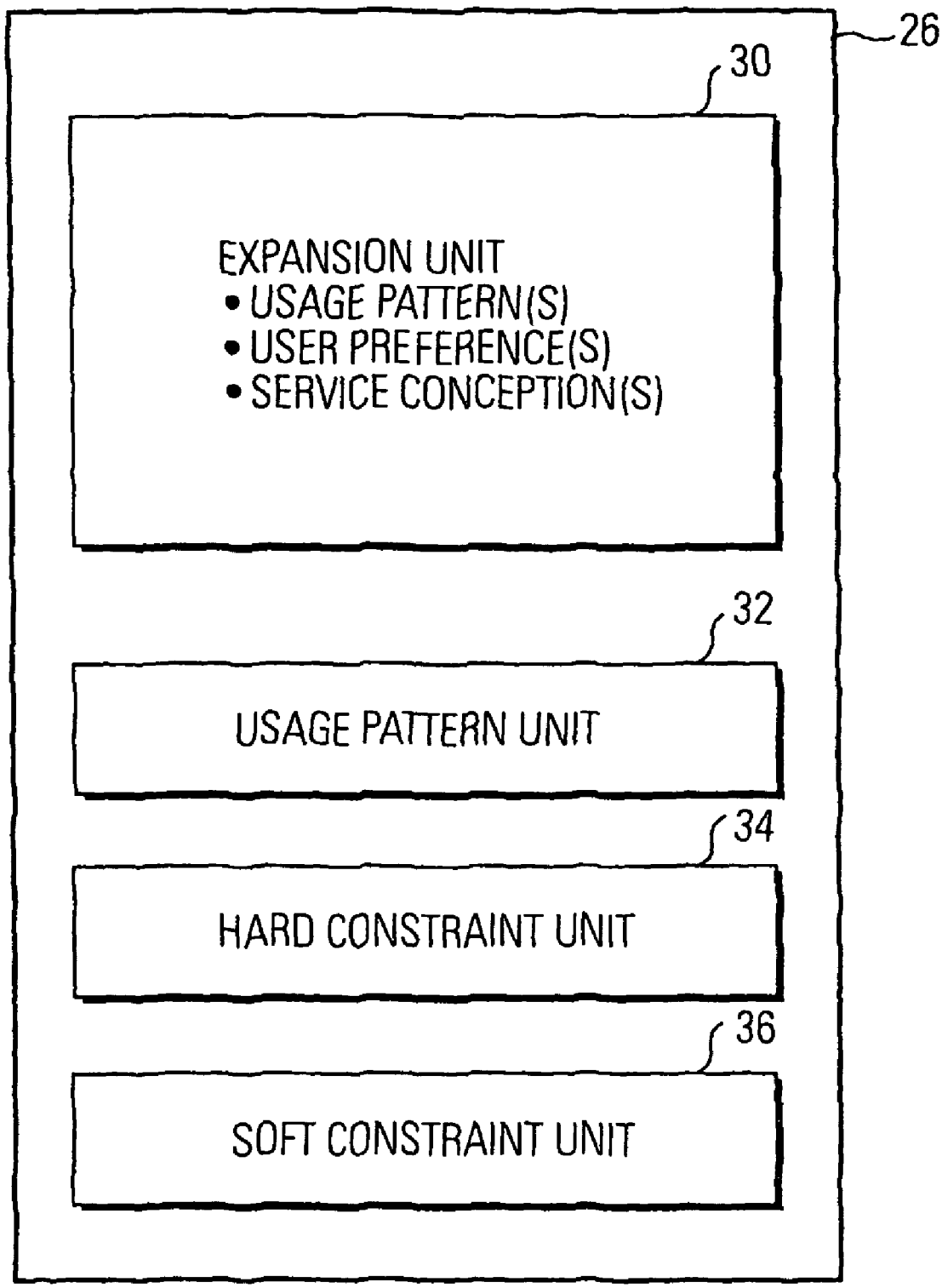
FIG. 7 shows a schematic diagram of the discovery statement unit shown in FIG. 4.

FIG. 7 shows a schematic diagram of the discovery statement unit 26 shown in FIG. 4.

As shown in FIG. 7, the discovery statement unit 26 comprises an expansion unit 30, a usage pattern unit 32, a hard constraint unit 34, and a soft constraint unit 36.

Before explaining details of operation of the expansion unit 30 shown in FIG. 7, it should be noted that usage patterns reflect typical service usage contexts for user groups. With respect to the application of usage patterns the assumption is that a query term submitted for service discovery is related to typical service provision scenarios, e.g., dining at a restaurant either on casual or on business occasion.

Further, expansion by user preferences implies consideration of service user specific preferences reflected typically in user profiles.

Still further, service conceptions according to the present invention mean different views on service characterization, e.g., according to a classification of restaurants along the conception of region like Asian or European or otherwise along the conception of taste like spicy or mild.

Figure 8:
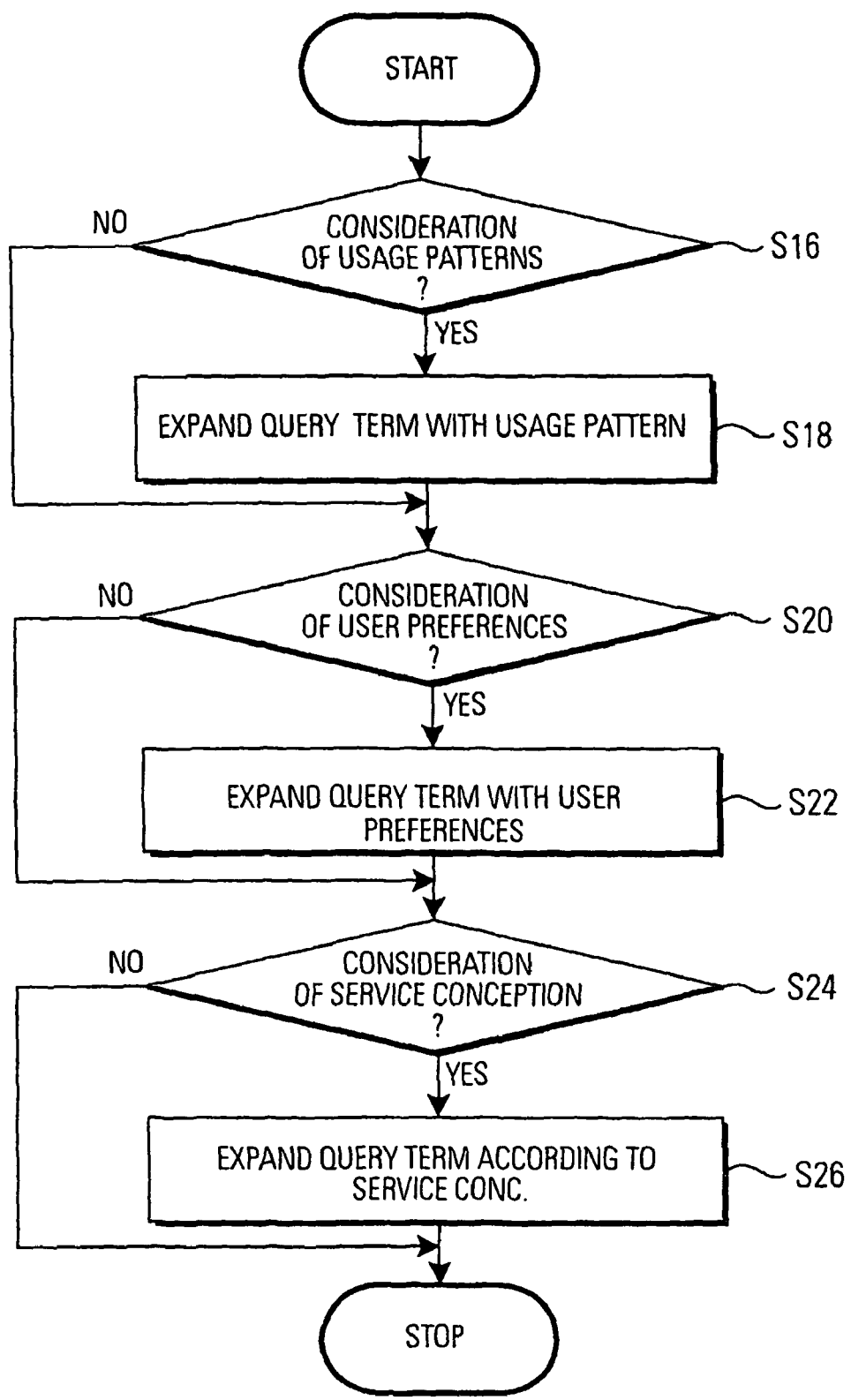
FIG. 8 shows a flowchart of operation of the expansion unit shown in FIG. 7.

FIG. 8 shows a flowchart of operation of the expansion unit 30 shown in FIG. 7.

As shown in FIG. 8, a step S16 relates to an interrogation whether expansion by usage pattern is to applied or not.

In the affirmative case, in a step S18 the discovery statement is formulated by expanding the query term through parameters reflecting typical usage patterns.

Otherwise, the process flow will proceed to a step S20 to check whether user preferences are to be considered during service discovery. In the affirmative case, the process flow will proceed to step S22 wherein the discovery statement is formulated by expanding the query term according to user preferences retrieved from, e.g., user profiles or directly supplied by service user.

Otherwise, the process will proceed to a step S24 for interrogation whether user specific service conceptions are to be considered during service discovery or not. In the affirmative case, the process will proceed to a step S26 for formulation of the discovery statement by expanding the query term according to user specific service conceptions. Otherwise, the process flow will terminate.

While FIG. 8 shows a flowchart imposing an order of operating steps for the expansion unit, e.g., according to consideration of usage patterns, user preferences, service concepts, it should be noted that this ordering may be freely interchanged and therefore is non-binding for the scope of the present invention.

In the following, further details of operation of the expansion unit 30 will be explained referring to a pseudo-code representation which, again, is non-binding for the scope of the present invention.

A basic scheme formulating a discovery statement using a pseudo-code may be formulated according to

| | |
|---|---|
| DISCOVER | (selected ontology; starting_position) |
| FROM | query_term_parameter_1 = parameter_value_1 AND |
| | ... |
| | query_term_parameter_n = parameter_value_n |

Here, the term being DISCOVER reflects the fact that service discovery is initiated for a specific ontology and a specified starting position in the ontology.

In view of this, query term parameters instantiated by specific parameter values in the FROM clause will be compared to service parameters of service offers propagated through the service ontology for service discovery.

According to the present invention, it is proposed to expand these basic schemes with user specific information reflecting personalization constraints during service discovery.

A first expansion is expansion by usage pattern and may by represented in a pseudo-code representation according to

| | |
|---|---|
| DISCOVER | (selected ontology; starting_position) |
| FROM | query_term_parameter_1 = parameter_value_1 AND |
| | ... |
| | query_term_parameter_n = parameter_value_n AND |
| WHERE | |
| | usage_pattern_parameter_1 = usage_parameter_1 AND |
| | ... |
| | usage_pattern_parameter_m = usage_parameter_m |

With respect to the application of usage patterns, it should be noted that according to present invention also automated handling of usage pattern related aspects is supported as explained in the following.

Figure 9:
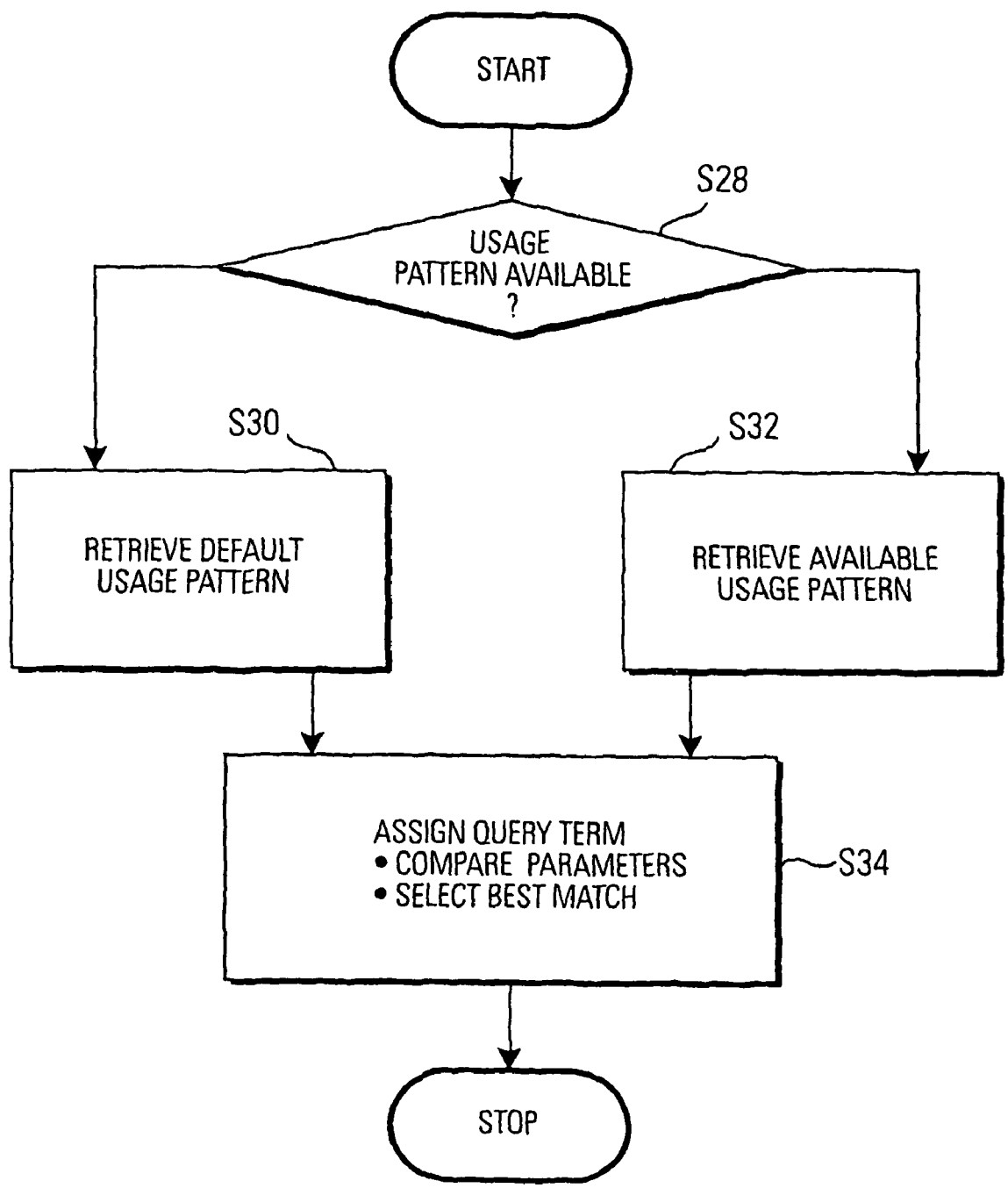
FIG. 9 shows a flowchart of operation of the usage pattern unit shown in FIG. 7.

FIG. 9 shows a flowchart of operation of the usage pattern unit 32 shown in FIG. 7.

As shown in FIG. 9, in a step S28 availability of usage pattern for service discovery is interrogated. If no usage patterns are available, in a step S30 a default usage pattern is retrieved. Otherwise, in a step S32 available usage pattern(s) with respect to the submitted query term are retrieved.

A shown in FIG. 9, in a step S34 an assignment of the query term to retrieve usage pattern(s) is achieved through comparison of parameters in the query term and selection of the best match. The generated result is used for service discovery for formulation of an appropriate discovery statement.

While above the expansion of the discovery statement with usage patterns has been described, a further aspect of the present invention relates to formulation of the discovery statement through expansion of the query term with user preferences.

Here, a pseudo-code representation of consideration of user preferences, again to be considered as non-binding for scope of the present invention, is given according to

| | |
|---|---|
| DISCOVER | (selected ontology; starting_position) |
| FROM | query_term_parameter_1 = parameter_value_1 AND |
| | ... |
| | query_term_parameter_n = parameter_value_n |
| PREFERING | |
| | User_preference_1_value ∈ |
| | service_attribute(s)_value_range |
| | PRIOR TO |
| | User_preference_2 ∈ set_of_service_attribute(s) |
| | PRIOR TO ... |
| | User_preference_n ∈ set_of_service_attribute(s) |

From the above, it should be clear that the pseudo-code representation expresses user preferences through implying an order on user preferences, e.g., parameters user_preference_1, ..., user_preference_n, according to the statements PREFERRING and PRIOR TO.

While this representation of an ordering of user preferences allows to incorporate user preferences, e.g., either expressed as service attributes or as preferred range of attribute values, into formulation of the discovery statement, according to the present invention it is also supported to incorporate a logical combination of such user preferences in combination with the set-up of an ordering, e.g., using an OR-conjunction of user preferences according to

| | |
|---|---|
| DISCOVER | (selected ontology; starting_position) |
| FROM | query_term_parameter_1 = parameter_value_1 AND |
| | ... |
| | query_term_parameter_n = parameter_value_n |
| PREFERING | |
| | User_preference_1 ∈ set_of_service_attribute(s) |
| | OR |
| | User_preference_2 ∈ set_of_service_attribute(s) |
| | PRIOR TO ... |
| | User_preference_n ∈ set_of_service_attribute(s) |

It should be noted that the OR-conjunction of user preferences allows to abstract from the structures given in the service ontology or, in other words, to traverse a service ontology freely without being strictly bound to the structure induced by the service ontology.

Further, it should be noted that the expansion of query terms during formulation of discovery statements may also be achieved, both, from usage pattern and user preferences in combination.

Further, not only with respect to parameters expressing user preferences but also with respect to parameters expressing usage patterns one may consider a logical combination thereof, e.g., according to

| | |
|---|---|
| DISCOVER | (selected ontology; starting_position) |
| FROM | query_term_parameter_1 = parameter_value_1 AND |
| | ... |
| | query_term_parameter_n = parameter_value_n |
| WHERE | |
| | usage_pattern_parameter_1 = usage_parameter_1 OR |
| | usage_pattern_parameter_2 = usage_parameter_2 |
| PREFERING | |
| | User_preference_1_value ∈ |
| | service_attribute(s)_value_range OR |
| | OR |
| | User_preference_2 ∈ set_of_service_attribute(s) |
| | PRIOR TO ... |
| | User_preference_n ∈ set_of_service_attribute(s) |

A further aspect of the present invention relates to consideration of service conceptions during formulation of discovery statements for service discovery. As outlined above, a service conception represents a view on services supported through the service ontology.

Here, a user preferred service conception may be incorporated into the discovery statement as supplement to the received query term, e.g., with an AND-conjunction. According to the pseudo-code representation the corresponding representation, again to be consider non-binding to the scope of the present invention, may be expressed according to

| | |
|---|---|
| DISCOVER | (selected ontology) |
| FROM | starting_point_in_selected_ontology |
| WHERE | query_term_parameter_1 = parameter_value_1 AND |
| | ... |
| | query_term_parameter_n = parameter_value_n AND |
| | user_conception_parameter_1 = |
| | conception_parameter_1 |
| | AND ... |
| | user_conception_parameter_k = |
| | conception_parameter_k |
| PREFERRING | |
| | User_preference_1 ∈ set_of_service_attribute(s) |
| | PRIOR TO |
| | User_preference_2 ∈ set_of_service_attribute(s) |
| | PRIOR TO ... |

For an understanding of the pseudo-code representation given above, it should be noted that independent of the user preferences given in the PREFERRING-clause any such specified user preference will always be considered with respect to the user conception expressed in the WHERE-clause. This allows to respect different service conceptions during service discovery.

A further aspect of formulating the discovery statement according to the present invention relates to the way user preferences, usage patterns, and service conceptions are expressed in the discovery statement.

As shown in FIG. 7, the discovery statement unit 26 comprises a hard constraint unit 34 and a soft constraint unit 36.

Operatively, the hard constraint unit 34 will express query term expansions as hard constraints that must be fulfilled. Further operatively, the soft constraint unit 36 will express query term expansions as soft constraints that should be fulfilled.

In view of the pseudo code representation given, hard constraints are incorporated into WHERE-clause wherein soft constraints are incorporated into PREFERRING-clauses.

Further, information being related to query term expansion may be collected from user profiles or usage pattern profiles. The build-up of such knowledge repositories may be achieved through consideration of previous service applications, collections of user preferences, service domain knowledge representation, and/or assumed user intentions.

While above different aspects of formulating a discovery statement according to the present invention have been explained with respect to FIG. 7 to 9, in the following aspects of service discovery will be explained with respect to FIG. 10 and FIG. 11.

Figure 10:
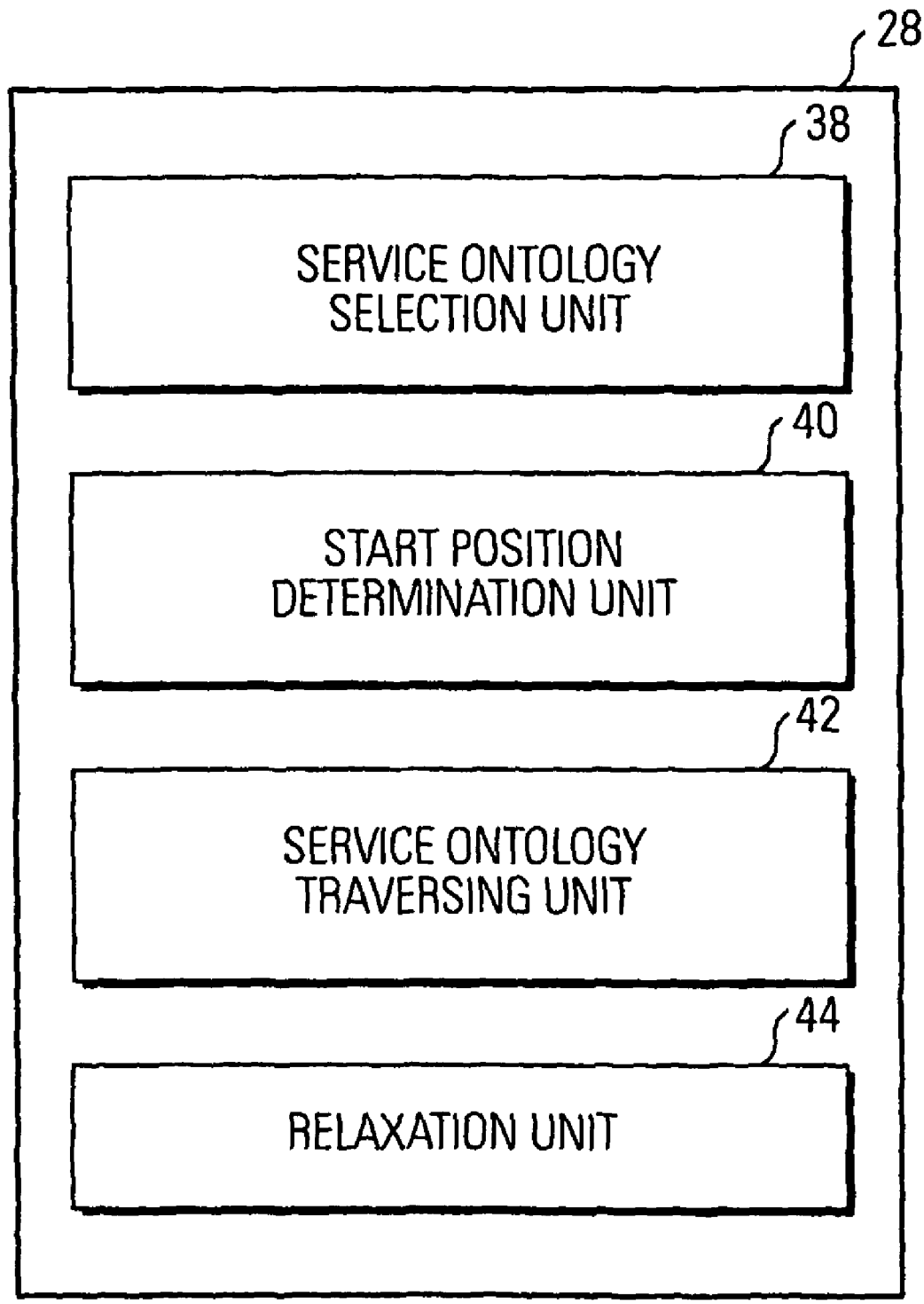
FIG. 10 shows a schematic diagram of the discovery unit shown in FIG. 4.

FIG. 10 shows a schematic diagram of the discovery unit 28 shown in FIG. 4.

As shown in FIG. 10, the discovery unit 28 shown in FIG. 4 comprises a service ontology selection unit 38, a start position determination unit 40, a service ontology traversing unit 42, and a relaxation unit 44.

Figure 11:
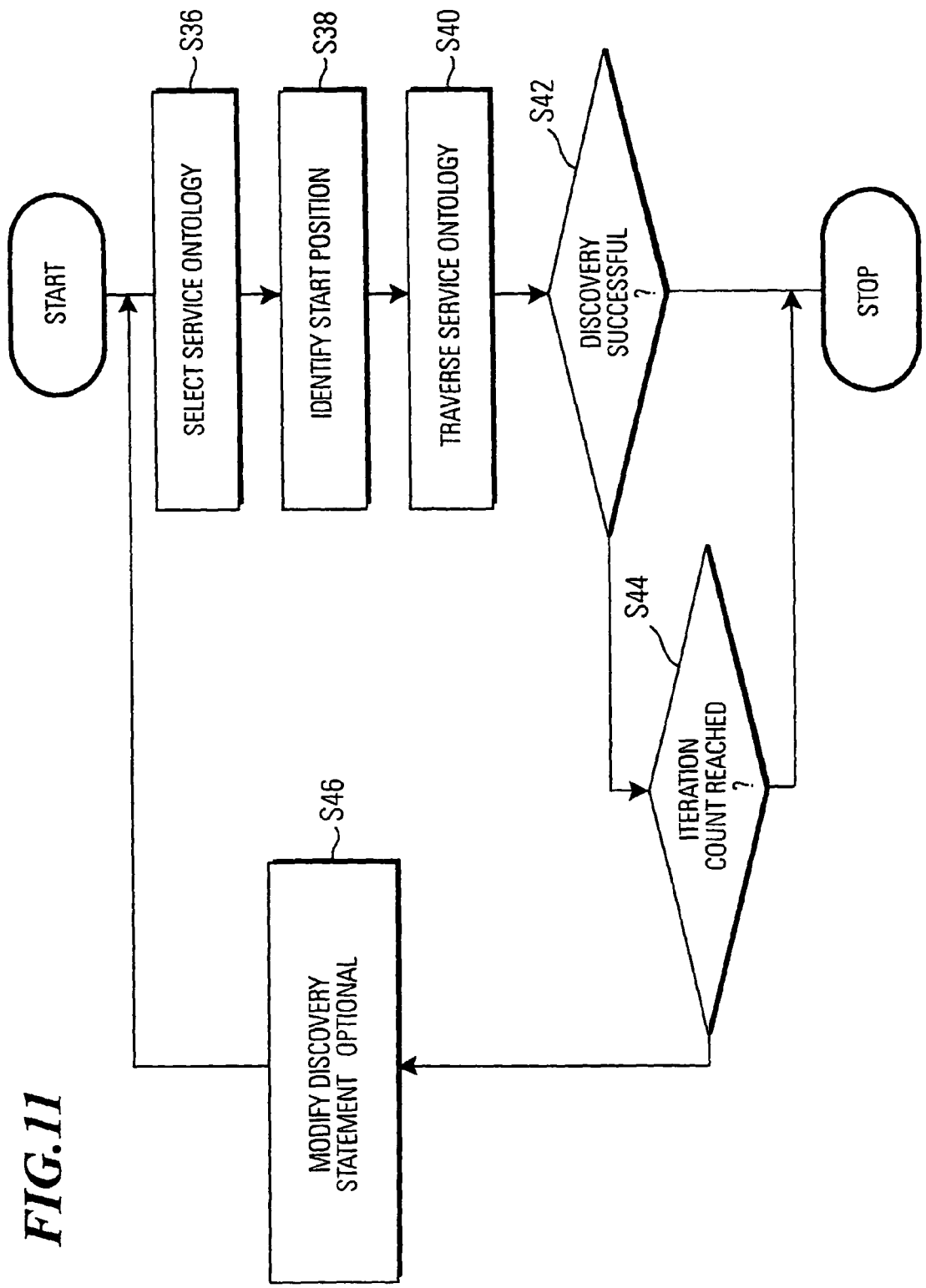
FIG. 11 shows a flowchart of operation for the discovery unit and related sub-units as shown in FIG. 10.

FIG. 11 shows a flowchart of operation of the discovery unit 28 and related sub-units 38 to 44 shown in FIG. 10.

As shown in FIG. 11, in a step S36, operatively executed by the service ontology selection unit 38, an initial service ontology is selected. It should be noted that this step S36 will only be executed when more than one service ontology is available for service discovery.

Further, service ontology selection according to the present invention relies on information provided via the query term and/or on user profile data. The result of service ontology selection is one service ontology that best suites the object of service discovery.

As shown in FIG. 11, in a step S38, operatively executed by the start position determination unit 40, a start position in the order of service characteristics is determined for subsequent service discovery. Preferably, according to the present invention it is proposed to subsume the query term as the starting concept into the service ontology and then to set a concept succeeding the starting concept as starting point for service discovery.

As shown in FIG. 11, in a step S40, operatively executed by the service ontology traversing unit 42, the selected service ontology is traversed on the basis of the formulated discovery statement, for comparison of this discovery statement with service characteristics advertised through the selected service ontology.

As shown in FIG. 11, in a step S42, operatively executed by the service ontology traversing unit 42, the success of service discovery is evaluated. When service discovery was successful of service discovery process will terminate. Otherwise the service discovery process will proceed to a further interrogation step S44 to evaluate whether the maximum count of iteration(s) for service discovery has been reached or not. In the affirmative case the service discovery process will terminate.

As shown in FIG. 11, when the service discovery did not yet terminate and the maximum iteration count is not yet reached, then the process will proceed to a step 46, operatively executed by the relaxation unit, for relaxation of the discovery statement.

It should be noted that relaxation during service discovery is optional as service discovery may, e.g., be re-iterated through selection of a different service ontology when a plurality of service ontologies are available.

It should also be noted that relaxation of the discovery statement may be achieved considering data reflecting user preferences, usage patterns, and/or service conceptions, e.g., as hard constraints or soft constraints.

Further relaxation could imply weakening or disregarding constraints having no appropriate counterpart in the service ontology when being traversed with a previous discovery statement.

As shown in FIG. 11, irrespective of whether the discovery statement is relaxed in step S46 or not, the process will then branch back to step S36 for a further iteration of service discovery.

While above different aspects and preferred embodiments of the present invention have been explained, in the following an example of application thereof to selection of a restaurant will be explained with respect to FIG. 12 and FIG. 13.

For the example to follow, in may be assumed without binding effect on the scope of the present invention that service ontologies are generated through OntoEdit, Ontoprise, Ontology Engineering Workbench, OntoEdit, http://www.ontoprise.com, a cooperative query database language along the notion as outlined in W. Keβling, G. Köstler, Preference SQL, Design, Implementation, Experiences, Proc. Of the Int. Conf. On Very Large Data Bases (VLDB'02), HongKong, China, 2002, is used for formulating discovery statements.

The example to follow relates to a service user aiming to discover restaurant services of local restaurants, e.g., using a mobile device, and trying to make the best match to discover a service for subsequent execution.

According to the example the service user may look for a restaurant service for dinner. Specifying the request to book a restaurant with Cantonese cuisine, service discovery should offer an appropriate service.

Figure 13:
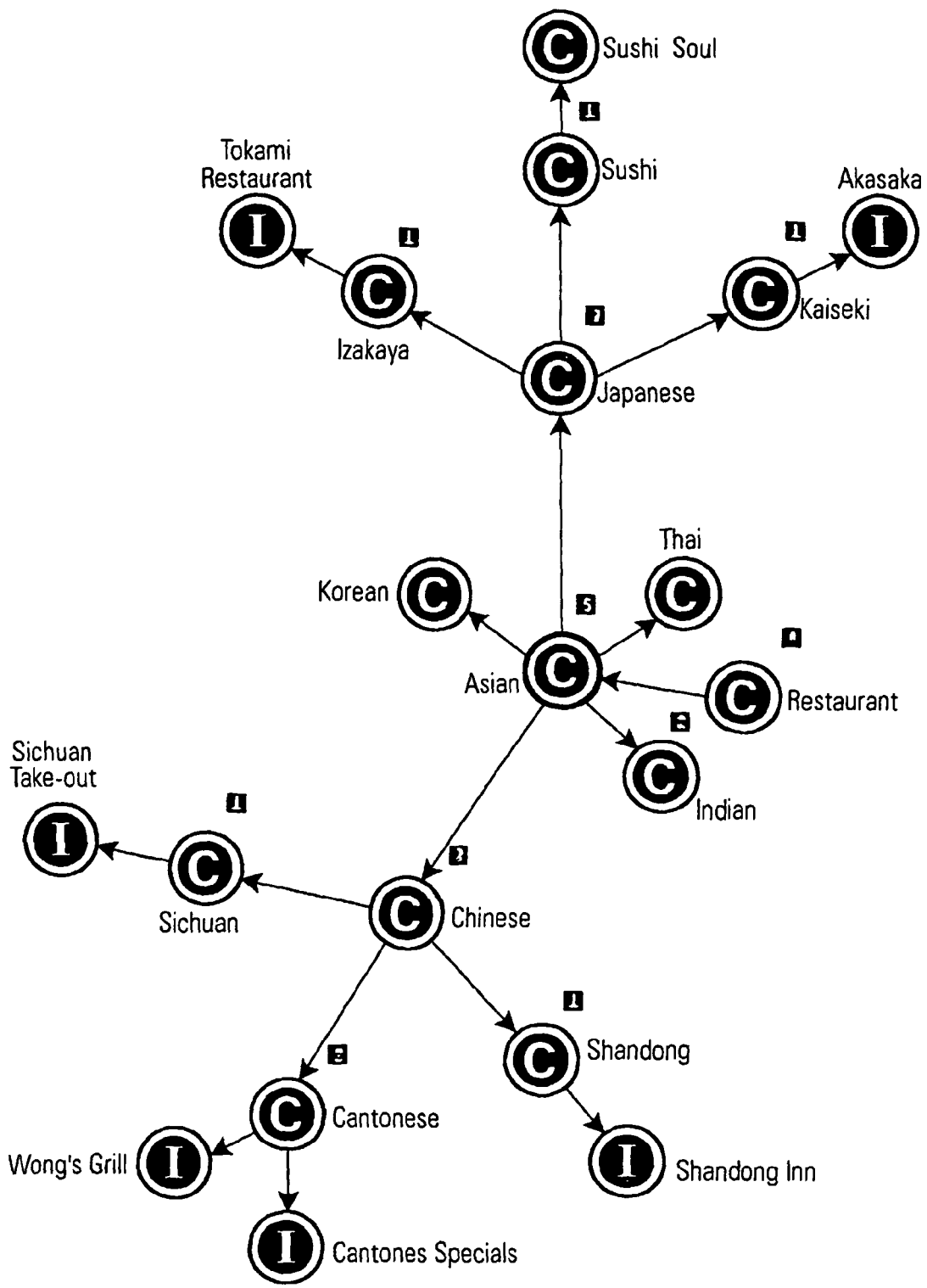
FIG. 13 shows restaurant services and dependencies according to the restaurant service ontology shown in FIG. 12.

Heretofore, FIG. 12 shows a restaurant service ontology as example for the application of the discovery mechanisms according to the present invention, and FIG. 13 shows restaurant services and dependencies according to the restaurant service ontology shown in FIG. 12.

The restaurant service ontology shown in FIGS. 12 and 13 focuses on the service conception regional cuisine. One may further assume that different usage patterns business and casual are available be query term expansion.

Using a SQL-style declarative query language the discovery statement may then be formulated according to

| | | |
|---|---|---|
| SELECT | grounding (service) | |
| FROM | Cantonese | |
| WHERE | category = casual. | |

If this discovery statement fails to deliver adequate services or if the service user is not yet satisfied the discovery statement will be relaxed along the structure implied by the service ontology relaxing Cantonese into Chinese according to

| | | |
|---|---|---|
| SELECT | grounding (service) | |
| FROM | Chinese | |
| WHERE | category = casual. | |

The relaxation will be iterated until a suitable match is found, e.g., the Shandong Inn.

Figure 14:
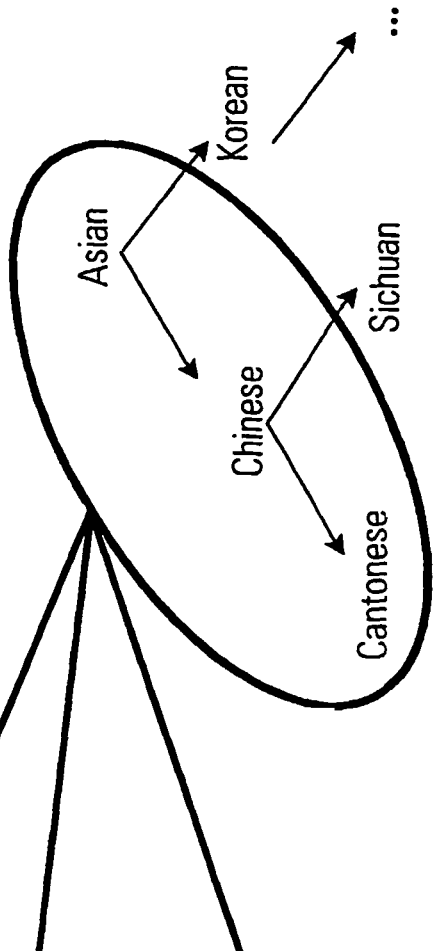
FIG. 14 shows step-by-step relaxation and a formulation of a cooperative discovery statement according to the present invention.

As shown in FIG. 14, using cooperative retrieval technology it is possible to put a related series of discovery statements into a single discovery statement, as generally outlined above, which discovery statement may then be executed over a cooperative database containing the service descriptions according to

| | | |
|---|---|---|
| SELECT | grounding (service) | |
| FROM | Restaurant | |
| WHERE | category = casual | |
| PREFERRING | (concept(service)) = Cantonese | |
| PRIOR TO | (concept(service)) = Chinese | |
| PRIOR TO | (concept(service)) = Asian. | |

In view of the above, it is possible to incorporate knowledge about the service user for improved service discovery. It may be assumed that the service user has a clear idea what restaurant styles are to be preferred. E.g., for entertaining important customers a service user might prefer expensive French or Japanese restaurants, or, if that is not possible, Italian cuisine. To incorporate these user preferences the discovery statement would be re-formulated for cooperative retrieval according to

| | | |
|---|---|---|
| SELECT | grounding (service) | |
| FROM | Restaurant | |
| WHERE | category = casual | |
| PREFERRING | (concept(service)) = French | |
| | OR (concept(service)) = Japanese | |
| PRIOR TO | (concept(service)) = Italian. | |

Another approach to service discovery personalization generally referred to above is consideration of service conception during service discovery. Here, it may be assumed that a service user does not state explicit preferences but relies on a certain service conception of cuisines.

As shown in FIGS. 12 and 13, the basic service ontology induces a regional based relaxation on the service conception of geographical regions. However, the service user might not see different cuisines related to their respective regions but by the dominance of flavour, e.g., hot and spice flavoured food, i.e., have a flavour based service conception.

In view of this, a query term, e.g., for an Indian restaurant would have to be expanded with respect to the flavour based service conception according to

| | | |
|---|---|---|
| SELECT | grounding (service) | |
| FROM | Restaurant | |
| WHERE | category = business | |
| AND | foodFlavour = hot | |
| AND | foodFlavour = spicy | |
| PREFERRING | (concept(service)) = Indian | |
| PRIOR TO | (concept(service)) = Asian. | |

Given this statement and the service ontology shown in FIGS. 12 and 13, the relaxation during service discovery would be achieved from Indian towards hot and spicy Asian restaurant services. Since there may be discovered no services having a flavour being advertised as hot and spicy, the service discovery would, due to the hard contraints reflecting the service user's service conception, ignore all other Asian services and finally discover the Quality TexMex Restaurant service.

The example given above again illustrates that formulation of a cooperative discovery statement and subsequent submission of this discovery statement to a service catalog, e.g., a cooperative database, allows for effective personalization of service discovery. According to the present invention this is possible not only for explicitly provided user preferences, but also for user specific service conceptions.

Further, suitable usage patterns provide sensible default models with helpful settings for a variety of service applications and with specific instances of applicable preferences for each user.

The invention claimed is:
1. A method of discovering at least one service being advertised with at least one specialized network node in a communication system with a node that includes an internal memory, comprising the steps of:
 receiving at least one service ontology describing an order of service characteristics as a service query;
 storing the at least one service ontology in the internal memory;
 formulating a discovery statement by expanding the service query with soft constraint parameters that should be fulfilled and with hard constraint parameters that must be fulfilled, the soft constraint parameters and the hard constraint parameters expressing user service concep- tions as different charcaracterizations of each service advertised through service ontologies; and discovering services with service attributes that match the discovery statement using the order of service characteristics described by the service ontology, the soft constraints, and the hard constraints;

wherein the discovering services step comprises a step of modifying the service ontology so as to represent service characteristics in compliance with the structure of the service query and using the elements in the modified service ontology following the service query as starting position for service discovery.

2. A method according to claim 1, characterized in that the order of service characteristics is hierarchical.

3. A method according to 1, wherein the step of formulating a discovery statement further comprising the steps of:

comparing type of query parameters and related values with type of usage pattern parameters and related values; and selecting a usage pattern with respect to a service query having a best match according to the comparison result.

4. A method according to claim 1, wherein the step of discovering services comprises a step of determining a starting position in the service ontology for subsequent service discovery; wherein the step of determining the starting position comprises the steps of subsuming the service query as starting concept reflecting a user's view on services into the service ontology; and setting a concept succeeding the starting concept as starting point for service discovery.

5. A method according to claim 1, characterized in that the step of discovering services comprises a step of traversing the service ontology with respect to the formulated discovery statement.

6. A method according to claim 1, characterized in that it further comprises a step of relaxing a discovery statement for iterative service discovery according to a relaxation order induced by the service ontology.

7. An apparatus for discovering at least one service being advertised With at least one specialized network node in a communication system with a node that includes an internal memory comprising:

a receiving unit adapted to receive at least one service ontology describing an order of Service characteristics as a service query;

a memory unit adapted to store the at least one service ontology in the internal memory;

a discovery statement unit adapted to formulate a discovery statement by expanding the service query with soft constraint parameters that should be fulfilled and with hard constraint parameters that must be fulfilled, the soft constraint and hard constraint parameters expressing user service conceptions as different characterizations of each service advertised through service ontologies; and a discovery unit adapted to discover services with service attributes that match the discovery statement using the order of service characteristics described by the service ontology, the soft constraints, and the hard constraints;

wherein the discovery unit is adapted to modify the service ontology so as to represent service characteristics in compliance with the structure of the service query and using the elements in the modified service ontology following the service query as starting position for service discovery.

8. An apparatus according to claim 7, characterized in that the memory unit is adapted to store the order of service characteristics in a hierarchical manner.

9. An apparatus according to claim 7, characterized in that it comprises a usage pattern unit adapted to assign a service query to a usage pattern through:

comparing type of query parameters and related values with type of usage pattern parameters and related values; and selecting a usage pattern with respect to a service query having best match according to the comparison result.

10. An apparatus according to claim 7, wherein the discovery unit comprises a starting position determination unit adapted to determine a starting position in the service ontology for subsequent service discovery through:

subsuming the service query as starting concept reflecting a user's view on services into the service ontology; and setting a concept succeeding the starting concept as starting point for service discovery.

11. An apparatus according to claim 7, characterized in that the discovery unit comprises a service ontology traversing unit adapted to traverse the service ontology with respect to the formulated discovery statement.

12. An apparatus according to claim 7, characterized in that the discovery unit comprises a relaxation unit adapted to relax a discovery statement for iterative service discovery according to a relaxation order induced by the service ontology.

13. A non-transitory computer-readable medium storing a computer program product for discovering at least one service being advertised using as least one service ontology, the computer program product comprising software code portions for performing the steps:

receiving at least one service ontology describing an order of service characteristics as a response to a service query;

storing the at least one service ontology in the internal memory;

formulating a discovery statement by expanding the service query with soft constraint parameters that should be fulfilled and with hard constraint parameters that must be fulfilled, the soft constraint parameters and the hard constraint parameters expressing user service conceptions as different characterizations of each service advertised through service otologies; and discovering services with service attributes that match: the discovery statement using the order of service characteristics described by the service ontology, the soft constraints, and the hard constraints;

wherein the discovering services step comprises a step of modifying the service ontology so as to pepresent service characteristics in with the structure of the service query and using the elements on the modified service ontology following the service query as starting position for service discovery.

* * * * *